(12) United States Patent
Janakiraman et al.

(10) Patent No.: US 11,488,063 B2
(45) Date of Patent: Nov. 1, 2022

(54) SYSTEMS AND METHODS FOR COGNITIVE SERVICES OF A CONNECTED FMS OR AVIONICS SAAS PLATFORM

(71) Applicant: Honeywell International Inc., Morris Plains, NJ (US)

(72) Inventors: Kirupakar Janakiraman, Madurai (IN); Rajeev Mohan, Bangalore (IN); Ramkumar Rajendran, Theni District (IN)

(73) Assignee: Honeywell International Inc., Charlotte, NC (US)

( * ) Notice: Subject to any disclaimer, the term of this patent is extended or adjusted under 35 U.S.C. 154(b) by 425 days.

(21) Appl. No.: 16/805,101

(22) Filed: Feb. 28, 2020

(65) Prior Publication Data
US 2020/0285996 A1 Sep. 10, 2020

(30) Foreign Application Priority Data
Mar. 5, 2019 (IN) .............................. 201941008467

(51) Int. Cl.
*G06N 20/00* (2019.01)
*B64D 43/00* (2006.01)
*G06N 7/00* (2006.01)

(52) U.S. Cl.
CPC ............. *G06N 20/00* (2019.01); *B64D 43/00* (2013.01); *G06N 7/005* (2013.01)

(58) Field of Classification Search
None
See application file for complete search history.

(56) References Cited

U.S. PATENT DOCUMENTS

| 9,369,410 B2* | 6/2016 | Capper .................. H04L 51/02 |
| 2012/0265372 A1 | 10/2012 | Hedrick |
| 2015/0294216 A1* | 10/2015 | Baughman ............. G06N 20/00 706/11 |
| 2017/0329867 A1* | 11/2017 | Lindsley ............... G06F 16/367 |

(Continued)

OTHER PUBLICATIONS

European Search Report dated Aug. 17, 2020 in European Patent Application No. 20161332.0 (9 pages, in English).

(Continued)

*Primary Examiner* — Anna C Deng
(74) *Attorney, Agent, or Firm* — Bookoff McAndrews, PLLC

(57) ABSTRACT

Disclosed are methods, systems, and non-transitory computer-readable medium for cognitive services for a FMS SaaS platform. For instance, the method may include obtaining training data; training reinforcement learning model(s) using the obtained training data; in response to receiving a request for cognitive services from a user device, analyzing a query of the request for cognitive services using at least one reinforcement learning model of the trained reinforcement learning model(s); determining intent, entity(s), emotion, and/or context of the query based on an output of the at least one reinforcement learning model to form a cognitive services request; applying a second at least one reinforcement learning model of the trained reinforcement learning model(s) to the cognitive services request to determine one or more services to invoke; and transmitting a result to the user device based on an output of the one of more invoked services.

20 Claims, 6 Drawing Sheets

(56) References Cited

U.S. PATENT DOCUMENTS

| | | | |
|---|---|---|---|
| 2018/0114173 A1 | 4/2018 | Blomberg et al. | |
| 2018/0204467 A1* | 7/2018 | Crump | G06Q 30/0283 |
| 2018/0233132 A1* | 8/2018 | Herold | H04N 21/231 |
| 2021/0081824 A1* | 3/2021 | Ranatunga | G06Q 30/0201 |
| 2021/0264302 A1* | 8/2021 | Acharya | G06Q 30/0271 |
| 2021/0264303 A1* | 8/2021 | Acharya | G06Q 30/0201 |
| 2021/0406766 A1* | 12/2021 | Acharya | G06N 7/005 |
| 2022/0130134 A1* | 4/2022 | Jansen | G06V 40/15 |
| 2022/0159811 A1* | 5/2022 | Campanella | H05B 47/11 |

OTHER PUBLICATIONS

"Software as a Service." Wikipedia, the Free Encyclopedia, Sep. 20, 2016, 17:48, en wikipedia.org/w/index.php?title=Software_as_a_servicekoldid=542666774. (7 pages, in English).

* cited by examiner

SYSTEMS AND METHODS FOR COGNITIVE SERVICES OF A CONNECTED FMS OR AVIONICS SAAS PLATFORM

CROSS-REFERENCE TO RELATED APPLICATION(S)

This application claims the benefit of priority under 35 U.S.C. § 119 from Indian Patent Application No. 201941008467, filed on Mar. 5, 2019, the contents of which is incorporated by reference in its entirety.

TECHNICAL FIELD

Various embodiments of the present disclosure relate generally to systems and methods for cognitive services of a SaaS platform and, more particularly, to systems and methods for cognitive services of a connected flight management system (FMS) or Avionics SaaS platform.

BACKGROUND

Generally, as a complexity of SaaS platforms increase, such as in FMS SaaS platforms, there may be an increasing demand for intelligent interaction mechanisms at human-computer interfaces of the SaaS platforms. For instance, responsive data and functionality to user's inquiry may be dynamic based on context or time or may be different for different users. For instance, questions from various users of FMS SaaS platforms, such pilots, an airliner operator, a passenger, or a maintenance engineer, may be substantially different. Moreover, SaaS platforms have diverse computing and data storage systems, each having their own interfaces. However, traditional mechanisms in interaction with the computing and data storage systems of SaaS platforms is to hard-wire (e.g., programmatically define acceptable pathways to obtain specific information or functionality) the components of the computing and data storage systems together to provide answers to specific user needs. This may be prohibitively expensive and time consuming to build, especially as a number of different services offered by SaaS platforms increases.

For instance, one of the only ways to interact with complex SaaS platforms may be by directly invoking interfaces provided by each individual sub-system (e.g., by an API call). In some cases, a user query may need interaction with multiple sub-systems that have to be hard-wired together, where outputs from one sub-system can be fed as inputs to other sub-systems. However, traditional techniques of custom coding each point to point interaction of sub-systems with a one-to-one relationship in a SaaS platform of many sub-systems and/or applications may be extremely costly.

Moreover, SaaS Platforms may lack one or more of the following properties: (1) an ability to support reasoning and inference over specific domains, such as avionics; (2) an ability to plan with inadequate information and a mechanism to obtain context sensitive data; (3) an ability to adapt to changing circumstances; and/or (4) an ability to learn from experience. An interface that has these four properties may be a cognitive service interface. However, key problems in human-computer interactions through cognitive service interfaces may be the ability of the SaaS platform to understand what a person wants (e.g., an intent), and to find the information and/or functionality that are relevant to the intent.

The present disclosure is directed to overcoming one or more of these above-referenced challenges.

SUMMARY OF THE DISCLOSURE

According to certain aspects of the disclosure, systems and methods are disclosed for cognitive services of a FMS SaaS platform.

For instance, a method may include: obtaining training data; training reinforcement learning model(s) using the obtained training data; in response to receiving a request for cognitive services from a user device, analyzing a query of the request for cognitive services using at least one reinforcement learning model of the trained reinforcement learning model(s); determining intent, entity(s), emotion, and/or context of the query based on an output of the at least one reinforcement learning model to form a cognitive services request; applying a second at least one reinforcement learning model of the trained reinforcement learning model(s) to the cognitive services request to determine one or more services to invoke; and transmitting a result to the user device based on an output of the one of more invoked services.

Moreover, a system may include: a memory storing instructions; and a processor executing the instructions to perform a process. The process may include: obtaining training data; training reinforcement learning model(s) using the obtained training data; in response to receiving a request for cognitive services from a user device, analyzing a query of the request for cognitive services using at least one reinforcement learning model of the trained reinforcement learning model(s); determining intent, entity(s), emotion, and/or context of the query based on an output of the at least one reinforcement learning model to form a cognitive services request; applying a second at least one reinforcement learning model of the trained reinforcement learning model (s) to the cognitive services request to determine one or more services to invoke; and transmitting a result to the user device based on an output of the one of more invoked services.

Furthermore, a non-transitory computer-readable medium may store instructions that, when executed by a processor, cause the processor to perform a method. The method may include: obtaining training data; training reinforcement learning model(s) using the obtained training data; in response to receiving a request for cognitive services from a user device, analyzing a query of the request for cognitive services using at least one reinforcement learning model of the trained reinforcement learning model(s); determining intent, entity(s), emotion, and/or context of the query based on an output of the at least one reinforcement learning model to form a cognitive services request; applying a second at least one reinforcement learning model of the trained reinforcement learning model(s) to the cognitive services request to determine one or more services of the FMS SaaS platform to invoke; and transmitting a result to the user device based on an output of the one of more invoked services.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Various embodiments of the present disclosure relate generally to cognitive services of SaaS platforms.

In general, the present disclosure is directed to methods and systems for cognitive services of a FMS SaaS platform. As discussed in further detail below, systems of the present disclosure may generate avionics domain model(s) (ADM) to perform cognitive services of a FMS SaaS platform. The ADM(s) may be trained using a pool of avionics data, and tuned and validated using certified FMS algorithms. Moreover, the ADM(s) may be constantly evolved using learning parameters and model hyperparameters to improve accuracy of user intent determination for the cognitive services. Furthermore, the cognitive services may prepare a specific service to obtain a response by requesting an API mashup that matches the user's intent. The API mashup may combine certified avionics objects, general avionics artifacts (e.g., aviation weather data), and data and/or functionality of third party APIs.

Specifically, one key to building a cognitive service is to build a cognitive model (such as the ADM(s)) that acknowledges an uncertainty in interpreting multi-modal user inputs, such as text, vision, voice, etc., and therefore view the multi-modal user inputs not as commands, but rather as observations from which the FMS SaaS platform may infer the intent of a user query. Based on the inferred intent of the user query, the SaaS platform may then obtain a responsive service from the FMS SaaS platform.

While this disclosure describes the systems and methods with reference to cognitive services of a FMS SaaS platform, it should be appreciated that the present systems and methods are applicable to cognitive services of SaaS platforms of other cloud aircraft systems or cloud-based services for other vehicles. The other cloud aircraft systems may include synthetic vision systems (SVS), ground proximity warning systems (GPWS), radar systems, engine systems, wheel systems, brake systems, power systems, or auxiliary power systems. The other vehicles may include drones, automobiles, ships, or any other autonomous and/or Internet-connected vehicle. Moreover, it should be appreciated that the present systems and methods are applicable cognitive services of SaaS platforms in general.

Figure 1:
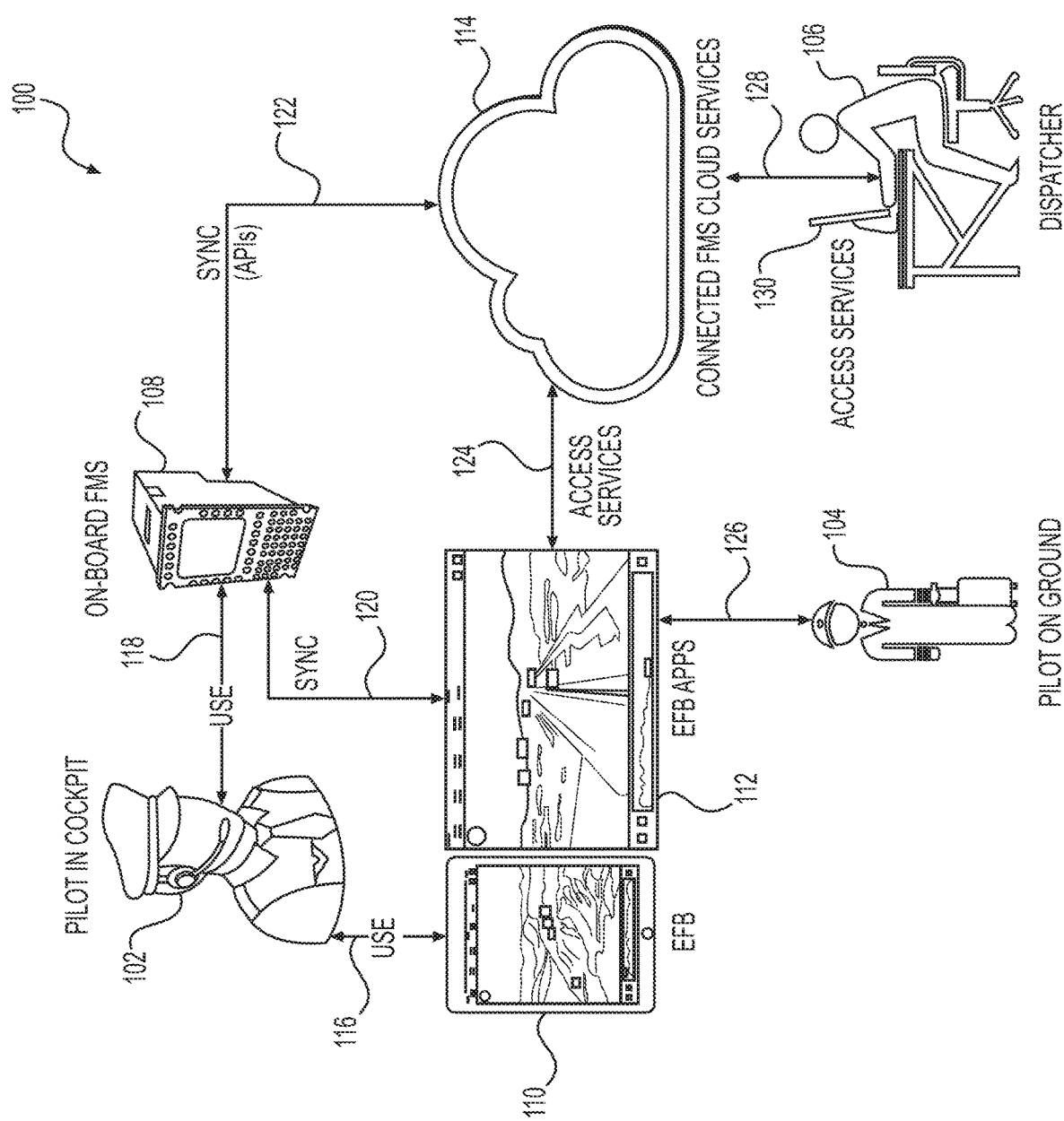
FIG. 1 depicts an overview of an example environment in which systems, methods, and other aspects of the present disclosure may be implemented.

Referring now to the appended drawings, FIG. 1 shows an overview of an example environment 100, according to one or more embodiments of the present disclosure. The environment 100 may be an example of a FMS SaaS platform that may receive requests for cognitive services, process the requests, and transmits responses based on the processed requests. The environment 100 may, for example, include an EFB (electronic flight bag) 110, an on-board FMS 108, a connected FMS cloud services platform 114, and/or a dispatcher device 130.

The EFB 110 may be a computer device carried by a pilot or a flight crew. The EFB 100 may store, for example, navigational charts, maps for air and ground operations of an aircraft, a flight plan management system, an aircraft operating manual, flight-crew operating manual, software applications which automate flight-related or avionics-related computation tasks, and/or any application or data which may be installed in a general purpose computing platform. The on-board FMS 108 may be any specialized computer system physically installed in an aircraft (e.g., the cockpit). The on-board FMS 108 may be programmed and/or customized to service the flight crew of the aircraft with in-flight tasks. The dispatcher device 130 may be any computer device which may be accessed by a user who performs planning, flying, navigating, or managing tasks associated with aircrafts, airspaces, airports, or flight plans. Accordingly, the user is not limited to a dispatcher, and the dispatcher device 130 is not limited to a device of a dispatcher. The connected FMS cloud services platform 114 may be a cloud-based platform. The connected FMS cloud services platform 114 may provide FMS services (including responding to API mashup requests and processing of API requests) to any user who has authorized access to the platform, as described in further detail below.

As shown in FIG. 1, the environment 100 may accommodate access by various types of users. For example, a pilot in cockpit 102 may have access to the EFB 110, EFB applications 112 installed in an EFB 110, and/or the on-board FMS 108 for accessing the connected FMS cloud services platform 114. Because of the fundamental avionic functions continually provided by the on-board FMS 108 during a flight, a pilot in cockpit 102 may use on-board FMS 108 as the sole or primary avionic system for performing in-flight tasks and operations 118. Additionally, the pilot in cockpit 102 may also use the EFB 110 within the cockpit (e.g., on a tablet or any other portable computing device), as a back-up FMS access device and/or a supplemental avionic device. The EFB applications 114 may access the connected FMS cloud service platform 114, and provide the FMS services to the users of the EFB 110 in which the EFB applications 114 are installed. In that way, the EFB 110 may provide user-friendly and customized user interfaces, by which FMS services from the platform 114 may be serviced, for example, to the pilot in cockpit 102.

The on-board FMS 108 may also be configured to synchronize data 122 with connected FMS cloud services platform 114, using, for example, an application programming interface (API). In addition, the on-board FMS 108 may also be configured to synchronize data 120 with EFB applications 112. Thus, in some implementations, the on-board FMS 108 may be synchronized with data from both EFB 110 and the platform 114 in real-time or at predetermined intervals, in such a way that the pilot in cockpit 102 may rely on the on-board FMS 108 for all tasks arising in the environment 100.

A pilot on ground 104 may also access the EFB 110 and the EFB applications 112. In some implementations, the pilot on ground 104 and the pilot on cockpit 102 may be the same pilot, yet under different circumstances (e.g., time and location of the access). Additionally, or alternatively, the pilot on ground 104 may be a different pilot, or another authorized member of the flight crew, who accesses EFB 110 on the ground for an official duty related to the connected FMS cloud services 114. While the pilot on ground 104 is accessing the EFB applications 112 via EFB 110, the EFB applications 114 may access the connected FMS cloud service platform 114, and receive various FMS services from it. In that way, the EFB 110 may provide user-friendly and customized user interfaces, by which FMS services 126 from the connected FMS cloud service platform 114 may be serviced to the pilot on ground 104.

A dispatcher 106 may also access the connected FMS cloud services platform 114, through a dispatcher device 130. A dispatcher, in accordance with the present disclosure, may be any authorized personnel performing duties related to dispatching of aircrafts in the environment 100. For example, a dispatcher may be an airline staff, an airport staff, air traffic control personnel, a ground control personnel, a member of a relevant aviation authority, or any other authorized person who may benefit from FMS services from the connected FMS cloud services platform 114 in performing his/her duties. A dispatcher device 130 may be any computing device capable of establishing a connection 128 to the cloud and interfacing with the connected FMS cloud services platform 114. While a dispatcher 106 is accessing the FMS services via the dispatcher device 130, the dispatcher device 130 may access the connected FMS cloud service platform 114, and receive various FMS services from it. In that way, the dispatcher device 130 may provide user-friendly and customized user interfaces, by which FMS services 126 from the connected FMS cloud service platform 114 may be serviced to the dispatcher 106.

The on-board FMS 108, the EFB 110 and the dispatcher device 130 may include one or more devices capable of receiving, generating, storing, processing, and/or providing information associated with FMS services. For example, the on-board FMS 108, the EFB 110 or the dispatcher device 130 may include a communication and/or computing device, such as a mobile phone (e.g., a smart phone, a radiotelephone, etc.), a computer (e.g., a desktop computer, a laptop computer, a tablet computer, a handheld computer), a gaming device, a wearable communication device (e.g., a smart wristwatch, a pair of smart eyeglasses, etc.), or a similar type of device.

As indicated above, FIG. 1 is provided merely as an example. Other examples are possible and may differ from what was described with regard to FIG. 1. The number and arrangement of devices and networks shown in FIG. 1 are provided as an example. In practice, there may be additional devices, fewer devices and/or networks, different devices and/or networks, or differently arranged devices and/or networks than those shown in FIG. 1. Furthermore, two or more devices shown in FIG. 1 (e.g., EFB 110 and dispatcher device 130) may be implemented within a single device, or a single device shown in FIG. 1 (e.g., EFB 110, on-board FMS 108, or dispatcher device 130) may be implemented as multiple, distributed devices. Additionally, or alternatively, a set of devices (e.g., one or more devices) of environment 100 may perform one or more functions described as being performed by another set of devices of environment 100.

Figure 2:
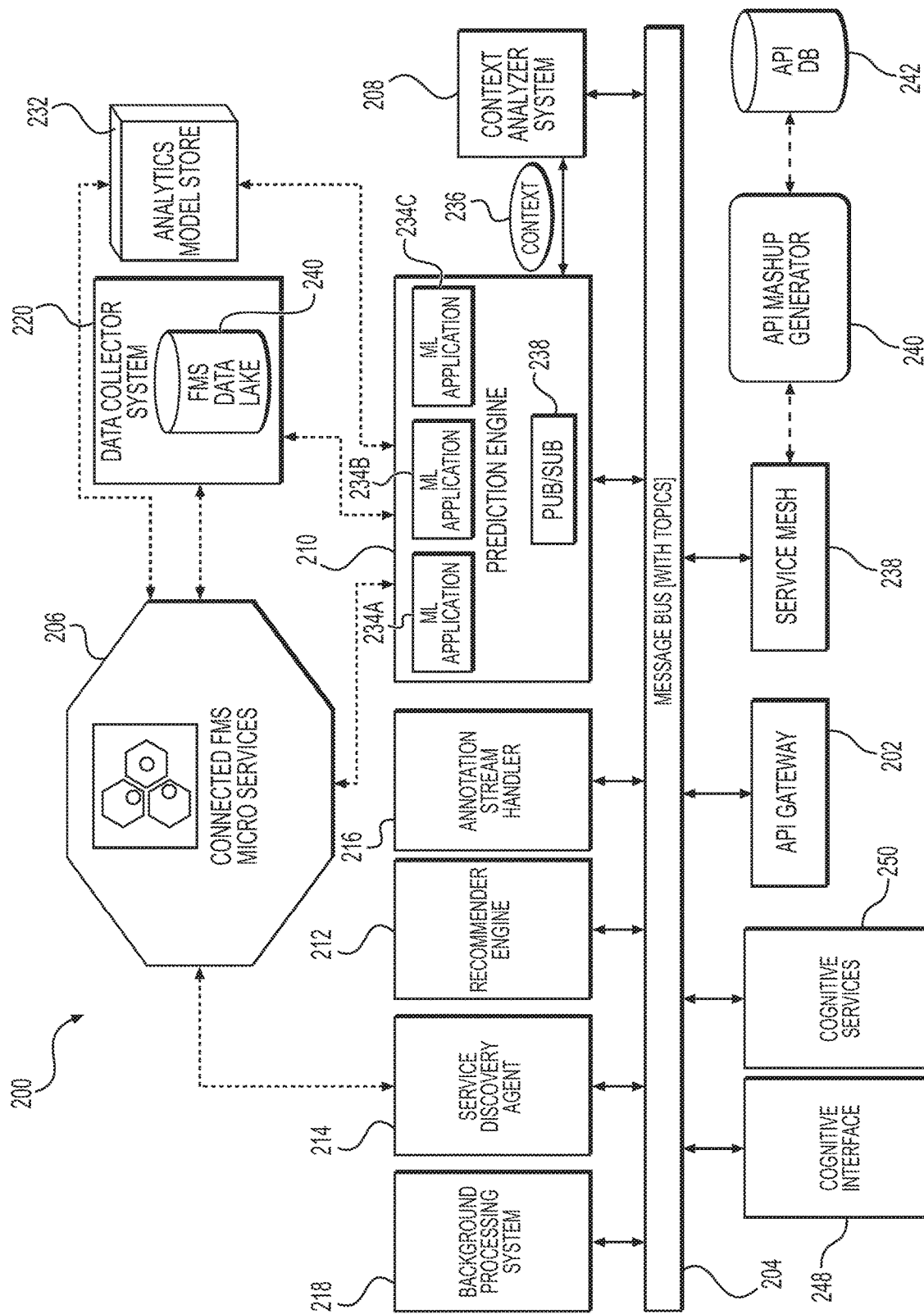
FIG. 2 depicts a block diagram schematically showing a connected FMS cloud services platform, according to one or more embodiments.

FIG. 2 depicts a block diagram schematically showing an example environment 200 in the connected FMS cloud services platform 114, according to one or more embodiments. The environment 200 (e.g., the connected FMS cloud services platform 114) may be an example of a FMS SaaS platform that receives requests for cognitive services, processes the requests, and transmits responses based on the processed requests.

As shown in FIG. 2, the environment 200 may include an API (application programming interface) gateway 202, a message bus 204, servicing modules 208-220, connected FMS micro-services 206, a service mesh 242, an API mashup generator 244, an API database (DB) 246, a cognitive interface 248, and/or a cognitive service 250. In some implementations, the environment 200 may correspond to the connected FMS cloud services platform 114, with the API gateway 202 allowing the communications 122, 124, and 128 depicted in FIG. 1. Components, devices, and modules of environment 200 may interconnect via wired connections, wireless connections, or a combination of wired and wireless connections.

The API gateway 202 may be a component which may serve as a point of entry for a group of micro-services, such as the connected FMS micro-services 206, the service mesh 242, and/or the API mashup generator 244. Depending upon various use cases, the API gateway 202 may be configured to accommodate requests or communications (e.g., requests from on-board FMS 108, EFB applications 112, or dispatcher device 130), invoke multiple back-end services (e.g., services by connected FMS micro-services 206) and aggregate and/or coordinate the results. The API gateway 202 may be in communication with the message bus 204, in order to communicate with the various back-end services. In addition, the API gateway 202 may be, for example, configured to be updated each time a new micro-service is added or removed in the connected FMS micro-services 206. The API gateway 202 may be implemented as hardware, software, and/or a combination of hardware and software.

The message bus 204 may be a connecting middleware between servicing modules 202-220, which enable the servicing modules 202-220 to interconnect and communicate amongst each other using messaging. The message bus 204 may include a messaging infrastructure, where each servicing module, for example, may provide data and allow other servicing modules to use them according to the modules' specific use cases. The message bus 204 may support, for example, single request/reply communications, group request/reply communications, and broadcast functions. In some implementations, servicing modules may provide data onto the message bus without mandating how the data are to be used, thereby resulting in free flow of data which allows various servicing modules to non-destructively consume and/or utilize those messages. The API gateway 202 may be implemented as hardware, software, and/or a combination of hardware and software.

The connected FMS micro-services 206 may be FMS services organized as a collection of specialized modular services. In some implementations, the connected FMS micro-services 206 may be software applications stored, at least in part, in one or more servers remote from on-board FMS 108, EFB 110, and dispatcher device 130, for cloud-based access from at least one of these devices. The connected FMS micro-services 206 may be modular services which are developed, deployed, and scaled independently of each other, messaging-enabled to communicate with various components within the environment 200, and organized around capabilities. The connected FMS micro-services 206 may include, for example, flight planning services, in-flight navigation services, airport specific services, ground communication services, weather services, services for computing fuel scenarios, services for computing optimization scenarios, services for offsetting deviations, and services for computing approach procedures (collectively "FMS atomic services" of avionics atomic services 306). The connected FMS micro-services 206 may be implemented as hardware, software, and/or a combination of hardware and software.

The FMS atomic services may be accessed by one or more FMS cloud APIs. Specifically, the API gateway 202 may receive API requests from a user device, in accordance with the one or more FMS cloud APIs, and process the API request by routing the API request to a FMS atomic service. The FMS atomic service may processes the API request and transmits a response to the API gateway 202. The API gateway 202 may transmit the response to the user device.

A context analyzer system 208 may be a servicing module included in the environment 200. The context analyzer system 208 may receive one or more context analysis parameters, use the parameters to determine contexts, and provide one or more contexts to the message bus and/or the prediction engine 210. Subsequently, the one or more determined contexts may be used at any other component connected to the context analyzer system 208 in the environment 200. The one or more contexts may be, for example, a flight context, an airport context, or a weather context, and the contexts may be determined from communicating with a cockpit, a ground system, an airport database system, and/or connected weather services. By determining contexts, the accuracy and efficiency of services provided by the environment 200 may be enhanced by adding intelligence to the ways that the services deliver results. For example, determining pending flight information and airport status information as contextual data may enable the prediction engine 210 to more accurately and dynamically predict which flight plan requests would be received in the next few hours. The contextual data provided by the context analyzer system 208 may be used for various use cases in the environment 200, as described in further detail below. The context analyzer system 208 may be implemented as hardware, software, and/or a combination of hardware and software.

A prediction engine 210 may be another servicing module included in the environment 200. The prediction engine may be in connection with the message bus, as well as with the connected FMS micro-services 206, FMS data lake 240, analytics model store 232, and/or the context analyzer system 208. The prediction engine 210 may predict FMS services which are required for specific contexts, or predict data which may be necessary for an FMS service(s) or an operation of another servicing module(s). Predictions provided by the prediction engine 210 may be used for various use cases in the environment 200. The prediction engine 210 may be implemented as hardware, software, and/or a combination of hardware and software.

The prediction engine 210 may include machine learning applications 234A-234C. While three machine learning applications (234A, 234B, and 234C) are depicted by way of example, the prediction engine 210 may be configured to include any number of one or more machine learning applications based on predetermined preferences. In some implementations, output(s) from one or more of the included machine learning applications may become input(s) for different one or more of the machine learning applications to arrive at inference or prediction results. Additionally, one or more of the included machine learning applications may, for example, have streaming analytics capability along with down sampling of data. The prediction engine 210 may, for example, use the machine learning applications 234A-234C trained on a training set (e.g., FMS micro-services that have been called under certain contexts) in order to analyze the FMS micro-services being correlated with certain contexts, generate a score for contexts representing a similarity to a given context, and select one or more FMS micro-services associated with contexts over a threshold score. In some implementations, the prediction engine 210 may analyze prior predictions, to the extent obtainable from environment 200 and/or other environments, to train the machine learning applications 234A-234C (e.g., using one or more big data techniques) and determine predictions of FMS services which are required for specific contexts, or data predicted to be necessary.

An analytical model store 232 may be a repository that may store pre-built machine learning models, each with its respective model index. The repository may be, for example, a centralized, cloud-based data repository. A model index may include, for example, information related to the purpose of the model, training data set, and the accuracy of the machine learning model. The prediction engine 210 may utilize one or more models from the analytical model store 232 based upon runtime needs. In addition, the prediction engine may include PUB/SUB component 238, which may be publisher/subscriber component that may operate on the message bus 204. In some implementations, the prediction engine 210 may use PUB/SUB 238 component to receive notifications from the message bus 204 by subscribing to certain event topics, and/or publish messages onto the message bus 204 to notify other peer applications.

A recommender engine 212 may be another servicing module included in the environment 200. The recommender engine 212 may be configured to determine one or more recommendations associated with the one or more FMS services, based on one or more recommendation requests, the one or more contexts, and/or the prediction data. The recommendation requests may be received from on-board FMS 108, EFB applications 112, or dispatcher device 130. Additionally, or alternatively, the recommendation requests may be received from any other servicing modules in the environment 200 or any of the connected micro-services 206. The determined recommendations may be, for example, different flight plans based on conditions relating to weather, traffic, and/or terrain, or one or more aircraft performance options (e.g., cost index calculations for an aircraft) based on one or more predicted scenarios (e.g., data predicted at the prediction engine 210). The recommender engine 212 may be implemented as hardware, software, and/or a combination of hardware and software.

A background processing system 218 may be a servicing module included in the environment 200. In some implementations, a service discovery agent 214 and annotation stream handler 216 may be modules controlled by the background processing system 218, and/or sub-modules included in the background processing system 218. For example, a service discovery agent 214 may identity the most appropriate available micro-service which may be dynamically required for the avionics application needs, and bind an application connection request to the identified micro-service. An annotation stream handler 216 may, for example, help the connected FMS cloud services modules 208-220 and the FMS micro-services 206 to refine the telemetry data from IoT (Internet of Things) cloud communication channel(s). In implementations where the service discovery agent 214 and the annotation stream handler 216 are included in the background processing system 218, the modules service discovery agent 214, annotation stream handler 216, and background processing system 218 may be collectively referred to as the background processing system 218. In some other implementations, the service discovery agent 214 and annotation stream handler 216 may be in communication with the background processing system 218, as separate modules in the environment 200. The service discovery agent 214 may discover one or more service(s) (e.g., FMS micro-services) to identify, for example, the discovered one or more service(s) as a scheduled service(s) that the background processing system 218 to prepare background support data for. The annotation stream handler 216 may, for example, create and manage annotations of data streams which are received and/or produced by the background processing system 218. For example, to coordinate delivery of large volume of data (e.g., background support data being delivered to data collector system 220), the annotation stream handler 216 may provide semantic annotation of streaming data to support dynamic integration of the prepared data into the predicted FMS micro-service(s).

The background processing system 218 may be configured to identify one or more background operations to support an operation of a first FMS service, and generate background support data for the first FMS service using the one or more background operations. The first FMS service may be, for example, a FMS micro-service, among the connected FMS micro-services 206, which is predicted by the prediction engine 210 as the FMS micro-service that may be required to run at a certain time based on a given context. As another example, the first FMS service may be a set of one or more micro-services, which may be scheduled to run in a particular time frame in the future. Once the first FMS service is identified, the background processing system 218 may identify one or more background operations to generate support data for the first FMS service. The background operations may be one or more FMS micro-services from the connected FMS micro-services 206, one or more software services from a source other than the connected FMS micro-services 206, or a combination thereof. The background processing system 218 may execute the background operations to prepare data for the first FMS service. Such background operations may be selected and executed under various use cases in the environment 200. The background processing system 218 may be implemented as hardware, software, and/or a combination of hardware and software.

A data collector system 220 may be a servicing module included in the environment 200. In some implementations, a data collector system 220 may include and/or control databases such as FMS data lake 240, as shown in FIG. 2. In some other implementations, a data collector system 220 may include and/or control one or more databases, without including and/or controlling the FMS data lake 240. In implementations where FMS data lake 240 is not included in the data collector system 220, the FMS data lake may be a separate database which is in communication with at least one of the message bus 204, a module among service modules 208-220, and the connected FMS micro-services 206.

The data collector system 220 may receive or generate data associated with one or more of the servicing modules (e.g., the context analyzer system 208, the recommender engine 212, the prediction engine 210, the background processing system 218, and the data collector system 220). The data collector system 220 may also store the usable data in a data repository (e.g., FMS data lake 240 or another database) for later use or retrieval by at least one of the servicing modules. In some implementations, the data collector system 220 may provide data repository (e.g., FMS data lake 240 or another database) where all raw data in their native format until the data are needed. In this way, the data may be stored in a flat architecture, with each data element tagged with a set of metadata. The data collector system 220 may be used for various use cases in the environment 200. The data collector system 220 may be implemented as hardware, software, and/or a combination of hardware and software.

The service mesh 242 may be an infrastructure layer of the environment 200 for handling service-to-service communication from, e.g., the connected FMS cloud services platform 114 to other cloud services (not depicted) of an entity. The other cloud services may include a cloud-based synthetic vision system (SVS), a cloud-based ground proximity warning system (GPWS), a cloud-based radar system, a cloud-based engine system, a cloud-based wheel system, a cloud-based brake system, a cloud-based power system, and/or a cloud-based auxiliary power system (collectively, "cloud avionics services"). The service mesh 242 may receive messages from and transmit messages to the cloud avionics services for the connected FMS cloud services platform 114. The service mesh 242 may be implemented as hardware, software, and/or a combination of hardware and software.

The service mesh 242 may also receive, via the API gateway 202, user request(s) for a recommendation process and/or an invoke micro-service process. The service mesh 242 may process the user request(s) for the invoke micro-service process and/or the recommendation process. For instance, the service mesh 242 may receive a user request; determine whether the user request is for a recommendation process or an invoke micro-service process (e.g., based on an indicator in a header or message of the user request); if it is determined that the user request is for a recommendation process, forward the user request to the API mashup generator 244 (e.g., via the service discovery agent 214) and transmit a response message, if any, from the API mashup generator 244 to the user device; and if it is determined that the user request is for an invoke micro-service process, forward the user request to an appropriate cloud avionics service and/or the service discovery agent 214 of the connected FMS cloud services platform 114, and transmit a response message, if any, from the cloud avionics services and/or the connected FMS cloud services platform 114.

The API mashup generator 244 may perform an API mashup generation process and/or an API mashup recommendation process. The API mashup generator 244 may perform the API mashup generation process in response to a user request (e.g., a system administrator), every set period of time, or in response to an update to the API data (e.g., to update the generated API mashups). The API mashup generator 244 may perform the API mashup recommendation process in response to receiving a user request for a recommendation process from the service mesh 242. The API mashup generator 244 may be implemented as hardware, software, and/or a combination of hardware and software.

The API mashup generation process may generate one or more API mashups. Generally, the API mashup generation process executed by the API mashup generator 244 may include: obtaining API data for a plurality of APIs; processing the API data for the plurality of APIs to form a tree structure based on a text analysis of keywords of the API data; generating API mashups based on the tree structure and one or more of a plurality of example API datasets; and storing the generated API mashups with associated keywords in the API DB 246.

The API mashup recommendation process may transmit a list of one or more API mashups (e.g., generated according to the above process) to a user device, in response to a user request. Generally, the API mashup recommendation process executed by the API mashup generator 244 may include: receiving a user request (e.g., a service query) from a user (e.g., via a user device and the service mesh 242), wherein the user request may include an application requirement; determining whether any keywords of the stored API mashups in the API DB 246 are within a threshold similarity to the application requirement; and in response to determining one or more keywords are within the threshold similarity, transmitting a recommendation message to the user (e.g., via the user device and the service mesh 242), wherein the recommendation message may include one or more API mashups that correspond to the one or more keywords.

The API DB 246 may store the API data and/or the generated one or more API mashups with the associated keywords. For instance the API data and/or the generated one or more API mashups with the associated keywords may be stored in a structured manner (e.g., a relational DB) or a non-structured manner (e.g., non-relational DB, such noSQL or newSQL).

The cognitive interface 248 may receive user requests, interact with users via multi-model channels, and determine a user's intent based on the user request using a first set of one or more ADM(s), as discussed in more detail below with respect to FIGS. 3-5. Generally, the cognitive interface 248 may apply the first set of one or more ADM(s) to the user requests to determine user intent, and transmit the user intent to the cognitive service 250.

The cognitive services 250 may receive the user intent from the cognitive interface 248, and determine appropriate micro-services based on the user intent and a second set of one or more ADM(s), as discussed in more detail below with respect to FIGS. 3-5. Generally, the cognitive services 250 may apply the second set of one or more ADM(s) to the user intents to obtain target services of micro-services or an application requirement to be submitted to the API mashup builder 244.

The number and arrangement of modules, devices, and networks shown in FIG. 2 are provided as an example. In practice, there may be additional modules and devices, fewer modules, devices and/or networks, different modules, devices and/or networks, or differently arranged modules, devices and/or networks than those shown in FIG. 2. Furthermore, two or more devices included in environment 200 of FIG. 2 may be implemented within a single device, or a single device in the environment 200 of FIG. 2 may be implemented as multiple, distributed devices. Additionally, or alternatively, a set of devices (e.g., one or more devices) of environment 200 may perform one or more functions described as being performed by another set of devices of environment 200. Each servicing module (e.g., the context analyzer system 208, the recommender engine 212, the prediction engine 210, the background processing system 218, and the data collector system 220) may perform its functions using one or more computer processors, and in some implementations, each servicing module may comprise the one or more computer processors as a component therein.

Figure 3:
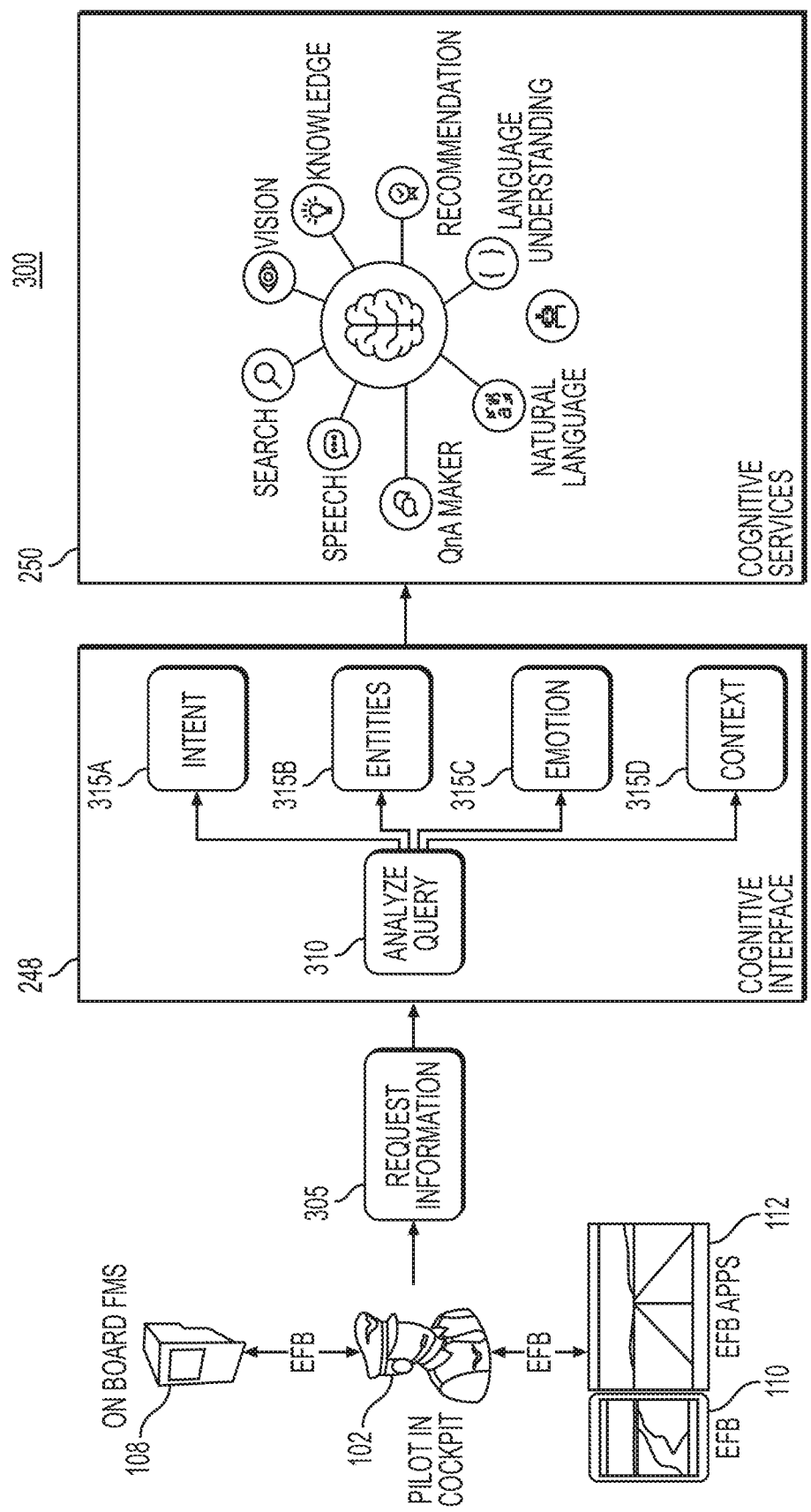
FIG. 3 depicts a block diagram of a system for cognitive services of a FMS SaaS platform, according to one or more embodiments.

FIG. 3 depicts a block diagram 300 of a system for cognitive services of a FMS SaaS platform, according to one or more embodiments. The block diagram 300 may include a request 305 that is received from a user (e.g., a pilot 102), the cognitive interface 248, and/or the cognitive services 250. The request 305 may be received by the API gateway 202 and forwarded to the cognitive interface 248.

The cognitive interface 248 may include one or more ADM(s) to implement a conversation application. The one or more ADM(s) may be domain-specific machine learning models. In one aspect of the disclosure, the ADM(s) may be machine learning models that are trained using certified FMS algorithm and avionics data. The conversation application may include an Avionics bot. The avionics bot may interact with a user in a conversational format using one or more channels. The channels may include text/SMS, voice, a chatbot, video calling, instant messaging, email, chat, etc. A content of the request 305 may be in a form of speech, text, images. The avionics bot may have a voice interface, a text interface, and/or a vision interface to process speech, text, and/or images of the request 305 into a format usable by a language interface of the avionics bot. The language interface may then extract meaning from the request 305. The avionics bot may also obtain avionics context information (e.g., user is on flight XYZ, which is currently at ABC location). The conversation application may transmit responses from the avionics bot to the user. The avionics bot may uses natural language understanding and machine learning (e.g., the one or more the ADM(s)) to extract the meaning from the request 305.

For instance, as depicted in FIG. 3, the avionics bot may analyze a query of a request 305 of a user at block 310 using the one or more the ADM(s) to extract meaning from the query. For instance, the avionics bot may obtain the request 305, apply transformations (e.g., from voice to text) and/or pre-processing to form feature vectors. The avionics bot may then apply the one or more ADM(s) to the feature vectors to obtain targets. The targets may include an intent 315A of a query, one or more entity(s) 3156 of the query, an emotion 315C of the query, and/or a context 315D of the query.

The intent 315A of a query may represent a task or action the user wants to perform. The intent 315A may be a purpose and/or goal expressed in the query. For example, a sample query may be "This is captain XYZ of AC-NNN at 12NM East of KPY, Heading 150, FL280, can I land in runway 17L of KLAX airport?" In this example, the intent of the pilots query may be "evaluate revised flight plan."

The one or more entity(s) 315B of the query may represent one or more words or phrases included in the query that needs to be extracted. The query may include one or more entity(s) 315B. An entity may represent a class including a collection of similar objects, e.g., such as nouns, identifiers, etc. In the above example, the entities may be "runway," "airport", "pilot," and "flight number."

The emotion 315C of the query may be a tone of the query. The tone may indicate whether the user is joyful, angry, or stressed, etc.

The context 315D of the query may represent a business context of the conversation that has been invoked, along with a situational awareness. The context 315D may be used to provide a response that may be personalized and meaningful to the user by connecting with the appropriate micro-service of the connected FMS cloud services platform 114. In the above example, the context may be "Pilot XYZ flying aircraft AC-NNN at position P needs assistance for unplanned flight-plan revision."

The targets may be considered meta-data information that has been derived from the query of the request 305. The meta-data information may be transmitted to the cognitive services 250.

The cognitive services 250 may receive the meta-data information. The cognitive services 250 may use the meta-data information to identify one or more cognitive service(s) to invoke one or more micro-service(s) of the connected FMS cloud services platform 114, to access third party APIs, and/or to identify application requirements to be submitted to the API mashup generator 244. For instance, the cognitive services 250 may apply one or more ADM(s) to the mete-data information and/or contextual data provided by the context analyzer system 208 to obtain a list of micro-services, third party APIs, or application requirements. Using the list of micro-services, third party APIs, or applications requirements, the cognitive services 250 may transmit invoke micro-service messages to the listed micro-services, transmit requests for data and/or functionality to the listed third party APIs, and/or transmit a request for an API mashup to the API mashup generator 244 with the listed application requirements.

After invoking the one or more micro-service(s) of the connected FMS cloud services platform 114 and/or accessing third party APIs, the cognitive services 250 may receive response(s) from the one or more micro-service(s) of the connected FMS cloud services platform 114 or the third party APIs. The cognitive services 250 may generate a response message based on the response(s) from the one or more micro-service(s) of the connected FMS cloud services platform 114 or the third party APIs. The cognitive services 250 may then transmit the response message to the cognitive interface 248.

The cognitive interface 248 may receive the response message from the cognitive services 250. The cognitive interface 248 may then generate a user response message (e.g., based on a channel being used to communicate with the user, such as voice, text, images, and/or data for on-board systems) based on the response message from the cognitive services 250. The cognitive interface 248 may then transmit the user response message to the user via the channel by using the avionics bot.

In addition to the voice interface, the text interface, the vision interface and/or the language interface, the cognitive interface 248 may include a recommender engine, search engine, a knowledge engine, and/or a question and answer engine. Each of these interfaces and/or engines may be implemented by an individual ADM of the ADM(s), or alternatively interfaces or engines may be grouped into individual ADM(s) based on related characteristics. The ADM(s) may be updated using re-enforcement learning mechanisms.

The ADM(s) may be partially observable Markov decision processes that integrate Bayesian belief tracking and trained using reward-based reinforcement learning methods. For instance, the partially observable Markov decision processes may be reinforcement learning models that operate on feedback acquired from a training data set (e.g., the avionics data discussed below) and/or end user avionics input queries, such as "What is the optimal SID/STAR which I can take with the current weather condition and traffic signature." The end user avionics input queries may not be a part of the training data set and, therefore, may be unknown utterances (e.g., feature vectors corresponding to speech, text, images, etc.). The reinforcement learning models may determine (e.g., as a target) an inference based on existing inferences of a policy of the reinforcement learning model (e.g., by scoring existing inferences). The reinforcement learning models may apply the determined inference on the end user avionics input query to determine a resultant decision. The resultant decision may be an indication to proceed or stop (e.g., go or no go). To integrate the Bayesian belief tracking, the reinforcement learning models may include a Bayesian belief network. The Bayesian belief network may be used to learn causal relationships among the avionics language utterances (e.g., component parts of the speech, text, images, etc.). The Bayesian belief network may be used to gain an understanding about a problem domain and to predict the consequences of intervention with an unknown data set (e.g., the end user avionics input queries). The reward-based reinforcement learning methods may update the reinforcement learning models (e.g., by updating the existing inferences of the policy) based on rewards of an rewards mechanism (depending on outcomes from the training data set and/or user feedback for the end user avionics input queries). The reward-based reinforcement learning methods may also update the Bayesian belief network to reflect new causal relationships among the avionics language utterances. The effectiveness of the ADM(s) in responding to the user's intents may then be quantified by the rewards mechanism as rewards. Decision logic (e.g., the policy) of the ADM(s) may be changed/optimized by maximizing the rewards output by the rewards mechanism. The ADM(s) may be distributed probabilistic models, so that the ADM(s) may evolve over time and adapt from experience. For instance, the distributed probabilistic models may predict, based on the utterances, a probability distribution over a set of classes, where the classes may be the existing inferences, and the distributed probabilistic models may select an existing inference with a highest probability as the determined inference. For instance, the ADM(s) may be tuned using hyperparameters to improve the accuracy of the ADM(s) on the user's queries over time. Furthermore, as the ADM(s) may be trained continuously, the ADM(s) may become better at differentiating variations in the user queries to decode intent.

The cognitive service 250 may collect avionics data as training data. The avionics data may include information from one or a combination of: flight planning and navigation databases; FMS performance databases; aircraft maintenance databases; minimum equipment lists (MEL) datasets; Flight operational quality assurance (FOQA) Datasets; weather databases; and/or traffic pattern datasets.

The ADM(s) may be trained with the training data, tuned using certified FMS components (e.g., by the Federal Aviation Authority (FAA)), and validated using public datasets. The ADM(s) may then wrapped be within a micro-service that handles API calls to a micro-service providing the functionality of the ADM(s).

Therefore, methods and systems of the present disclosure may enable discovery and integration of constantly updated APIs (and the associated micro-services) to external entities by the using the cognitive interface 248 and the cognitive services 250. The cognitive interface 248 may identify user intent, and the cognitive services 250 may identify appropriate micro-services based on the user intent.

Figure 4:
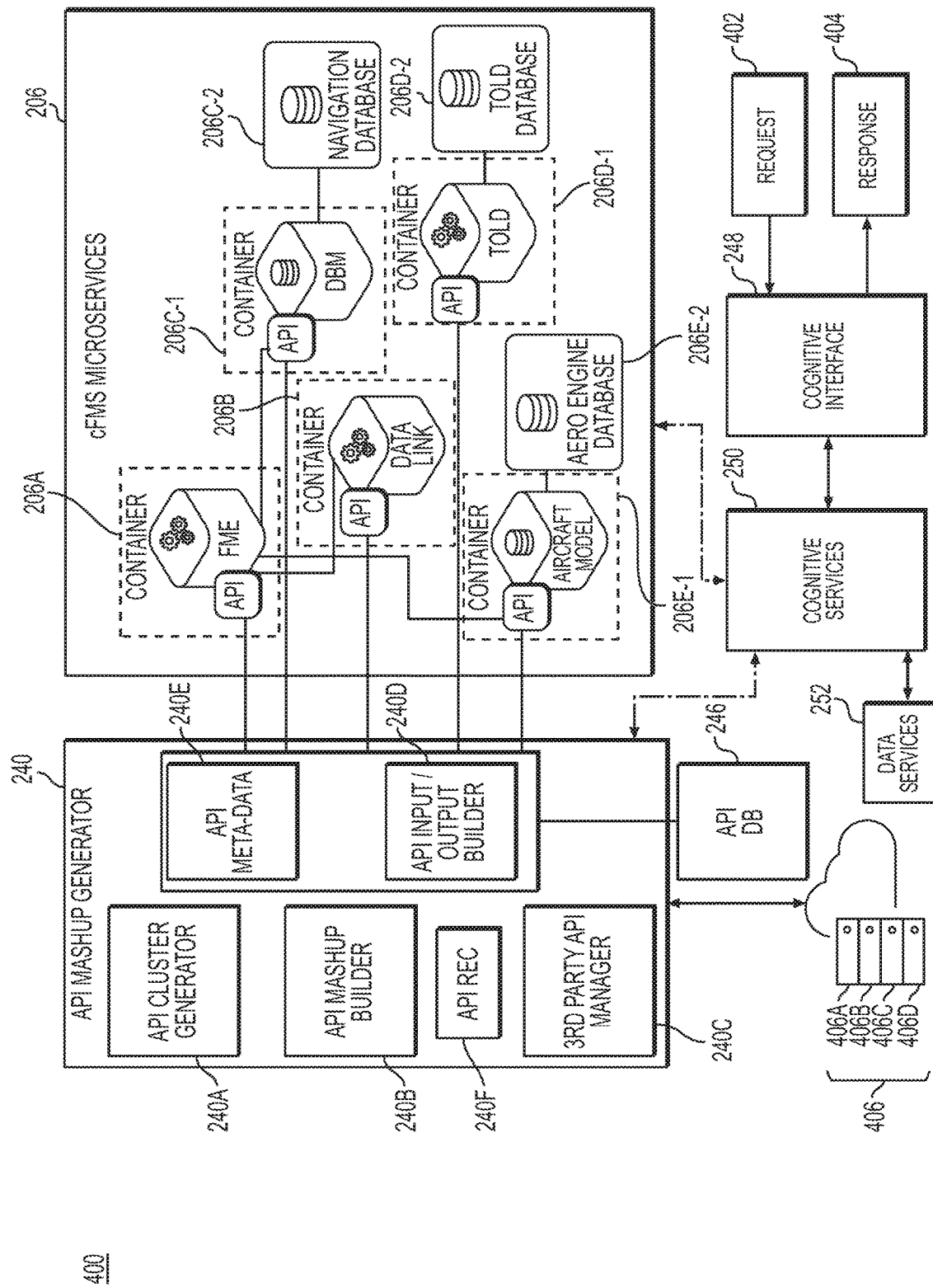
FIG. 4 depicts a block diagram of a system for cognitive services of a FMS SaaS platform, according to one or more embodiments.

FIG. 4 depicts a block diagram 400 of a system for cognitive services of a FMS SaaS platform, according to one or more embodiments. In the block diagram 400, the connected FMS cloud services platform 114 may include the API mashup generator 244, the connected FMS micro-services 206, the API DB 246, the cognitive interface 248, the cognitive services 250, and/or data services 252.

As discussed above the cognitive interface 248 may receive requests 402, and apply the one or more ADM(s) to feature vectors (based on the requests 402) to obtain targets. The targets may include an intent 315A of a query, one or more entity(s) 315B of the query, an emotion 315C of the query, and/or a context 315D of the query. The targets may be considered meta-data information that has been derived from the query of the request 305. The meta-data information may be transmitted to the cognitive services 250.

The cognitive services 250 may receive the meta-data information. The cognitive services 250 may use the meta-data information to identify one or more cognitive service(s) to invoke one or more micro-service(s) of the connected FMS cloud services platform 114, to access third party APIs, and/or to identify application requirements to be submitted to the API mashup generator 244. For instance, the cognitive services 250 may apply one or more ADM(s) to the meta-data information and/or contextual data provided by the context analyzer system 208 to obtain a list of micro-services, third party APIs, or application requirements. Using the list of micro-services, third party APIs, or applications requirements, the cognitive services 250 may transmit invoke micro-service messages to the listed micro-services, transmit requests for data and/or functionality to the listed third party APIs, and/or transmit a request for an API mashup to the API mashup generator 244 with the listed application requirements.

The data services 252 may include flight planning and navigation databases; FMS performance databases; aircraft maintenance databases; minimum equipment lists (MEL) datasets; Flight operational quality assurance (FOQA) Datasets; weather databases; and/or traffic pattern datasets, discussed above with respect to the training data. The data services 252 may also be accessed by the cognitive services 250 to provide specific context of a user, and/or provide information for generating responses to the user.

After transmitting the invoke micro-service messages, request for data and/or functionality, or request for an API mashup, the cognitive services 250 may receive responses from the micro-services, third party APIs, and/or the API mashup generator, and generate response for the cognitive interface 248. The cognitive services 250 may then transmit the response to the cognitive interface 248. The cognitive interface 248 may then generate a response 404 to the user, and transmit the response 404 to the user.

The connected FMS micro-services 206 may include one or more containers with one or more databases, such as a flight management engine (FME) container 206A, a data link container 206B, a navigation database manager (DBM) container 206C-1 with associated navigation DB 206C-2, a takeoff and landing data (TOLD) engine container 206D-1 with associated TOLD DB 206D-2, and/or aircraft model container 206E-1 and aero-engine DB 206E-2. Containers may include a specific software application programs, configurations, and dependencies. The containers may be hosted on a same or different virtual machine, with the virtual machine(s) being hosted on one or more servers of the connected FMS cloud services platform 114. The software application programs of the containers may be set (by the connected FMS cloud services platform 114) based on a processing load/number of requests for a type of API request to the connected FMS cloud services platform 114. For instance, a number of containers that are executing a certain software application program may be proportional to the processing load/number of requests for a certain type of API request. Moreover, each container may have an API access point that invokes a micro-service of the container, in accordance with the one or more FMS cloud APIs.

The FME container 206A may execute software application programs for the flight planning services and/or the in-flight navigation services of the FMS atomic services. The FME container 206A may include certified (e.g., by Federal Aviation Administration) FMS programs. The data link container 206B may execute software application programs for the communication services of the FMS atomic services. The DBM container 206C-1 may execute software application programs for navigation services for routing, terrain and obstacle avoidance, and/or restricted airspace avoidance, based on navigation data in the navigation DB 206C-2. The TOLD engine container 206D-1 may execute software application programs for generating departure or arrival procedures/sequences, based on runway and waypoint information in the TOLD DB 206D-2. The aircraft model container 206E-1 may execute software application programs for generating aircraft specific capabilities, based on performance information in the aero-engine DB 206E-2.

The API mashup generator 244 may include a API cluster generator 244A, an API mashup builder 244B, an API recommender (REC) 244C, a third party API manager 244D, an API meta-data collector 244E, and/or an API input/output builder 244F.

The API meta-data collector 244E, the API input/output builder 244F, and the third party API manager 244D may collect and/or generate API data. The API DB 246 may store the collected and/or generated API data.

The API meta-data collector 244E may collect meta-data, descriptions of API functionality, etc. for third party APIs 406, including one or more third party APIs 406A-406D (e.g. via the third party API manager 244D); the cloud atomic APIs; and/or the one or more FMS cloud APIs (collectively "a plurality of APIs"). For instance, the API meta-data collector 244E may collect, for each API of the plurality of APIs, category descriptions, primary category fields, secondary category fields, descriptions, documentation, schema information, etc.

For some of the third party APIs 406, the API meta-data collector 244E may also collect mapping data and functionality data for specific types of API repositories, such as existing avionics API repositories, mapping API repositories, weather API repositories, navigation API repositories, etc. The API meta-data collector 244E may store the mapping data and the functionality data. The mapping data and the functionality data for the specific types of API repositories may be included in a plurality of example API datasets. The mapping data may be configuration/arrangement information for an API repository, such as types of resources exposed by the API repository, an index of end-points for the resources exposed by the API repository, and/or relationships between the resources. The functionality data may be a description of data or functions provided by the resources exposed by the API repository.

The API input/output builder 244F may analyze the APIs of the plurality of APIs to generate meta-data about request inputs and response outputs for each of the plurality of APIs. The API input/output builder 244F may store the generated meta-data in the API DB 246. The request inputs may be one or a combination of data structures, data types, and/or instruction indicators. The response outputs may be one or a combination of data structures, data types, and/or instruction indicators. For instance, the API input/output builder 244F may analyze the documentation and schemes for the APIs to determine required API request inputs, such as data structures, data types, and/or instruction indicators; and extract meta-data about the required API request inputs. The API input/output builder 244F may also determine, for each of the required API request inputs, one or more expected response outputs, such as data structures, data types, and/or instruction indicators.

The third party API manager 244D may collect the API data discussed above for the third party APIs 406 for the API meta-data collector 244E. The third party API manager 244D may also periodically re-collect the API data to determine if new third party APIs are available and/or if the third party APIs 406 have been updated, and provide the additional third party APIs and/or updates to the API meta-data collector 244E.

As discussed above, the API mashup generator 244 may perform the API mashup generation process in response to a user request (e.g., a system administrator), every set period of time, or in response to an update to the API data (e.g., to update the generated API mashups). The API mashup generator 244 may perform the API mashup generation process in three stages. The API cluster generator 244A may perform a first stage to generate a tree structure. The API mashup builder 244B may perform a second stage to generate API mashups and perform a third stage to rank the generated API mashups.

The API cluster generator 244A may obtain the API data for the plurality of APIs from the API DB 246. The API cluster generator 244A may then process the API data for the plurality of APIs to form a tree structure. The tree structure may be based on a text analysis of each of the plurality of APIs to group APIs into sub-clusters of the tree structure. The sub-clusters may be branched below clusters of the tree structure. The clusters may be branched below categories of the tree structure.

The API cluster generator 244A may perform the first stage to generate the tree structure, as discussed above, and the API cluster generator 244A may store the tree structure in the API DB 246 and/or send a message to the API mashup builder 244B indicating that the first stage is complete and/or with sub-cluster keywords.

The API mashup builder 244B may perform the second stage to generate API mashups after the tree structure is stored in the API DB 246 or in response to receiving the message indicating that the first stage is complete. The API mashup builder 244B may obtain one or more of the plurality of example API datasets from the API DB 246. For instance, the API mashup builder 244B may obtain example API datasets that correspond to the categories of the tree structure, either by retrieving example API datasets from the API DB 246 or by instructing the API meta-data collector 244E to obtain example API datasets, if there are no example API datasets corresponding to a category stored in the API DB 246.

The API mashup builder 244B may generate sub-cluster keyword combinations based on the plurality of example API datasets and the sub-cluster keywords for the sub-clusters of the tree structure. In one aspect of the disclosure, a sub-cluster keyword combination may include one or more sub-cluster keywords of a category. In another aspect of the disclosure, the sub-cluster keyword combination may include one or more sub-cluster keywords of a cluster.

In this manner, the API mashup builder 244B may generate a plurality of API mashups based on the tree structure, for each sub-cluster keyword combination of each category. The API mashup builder 244B may store the generated plurality of API mashups in the API DB 246 (collectively "API mashup data").

Optionally, the API mashup builder 244B may perform the third stage to rank the generated API mashups. The API mashup builder 244B may perform the third stage to rank the generated API mashups after the API mashups are stored in the API DB 246, or immediately after the second stage without storing the API mashups in the API DB 246, based on priority factors.

The API REC 244C of the API mashup generator 244 may perform the API mashup recommendation process in response to receiving a service query for a recommendation process from the service mesh 242. The service query may be based on a user request from a user device or from the cognitive services 250, and the service query may include an application requirement. An application requirement may include text-strings indicating data types or functionality.

In response to receiving the service query, the API REC 244C may retrieve the API mashup data. The API REC 244C may generate and transmit a response based on the API mashup data and the service query.

Figure 5:
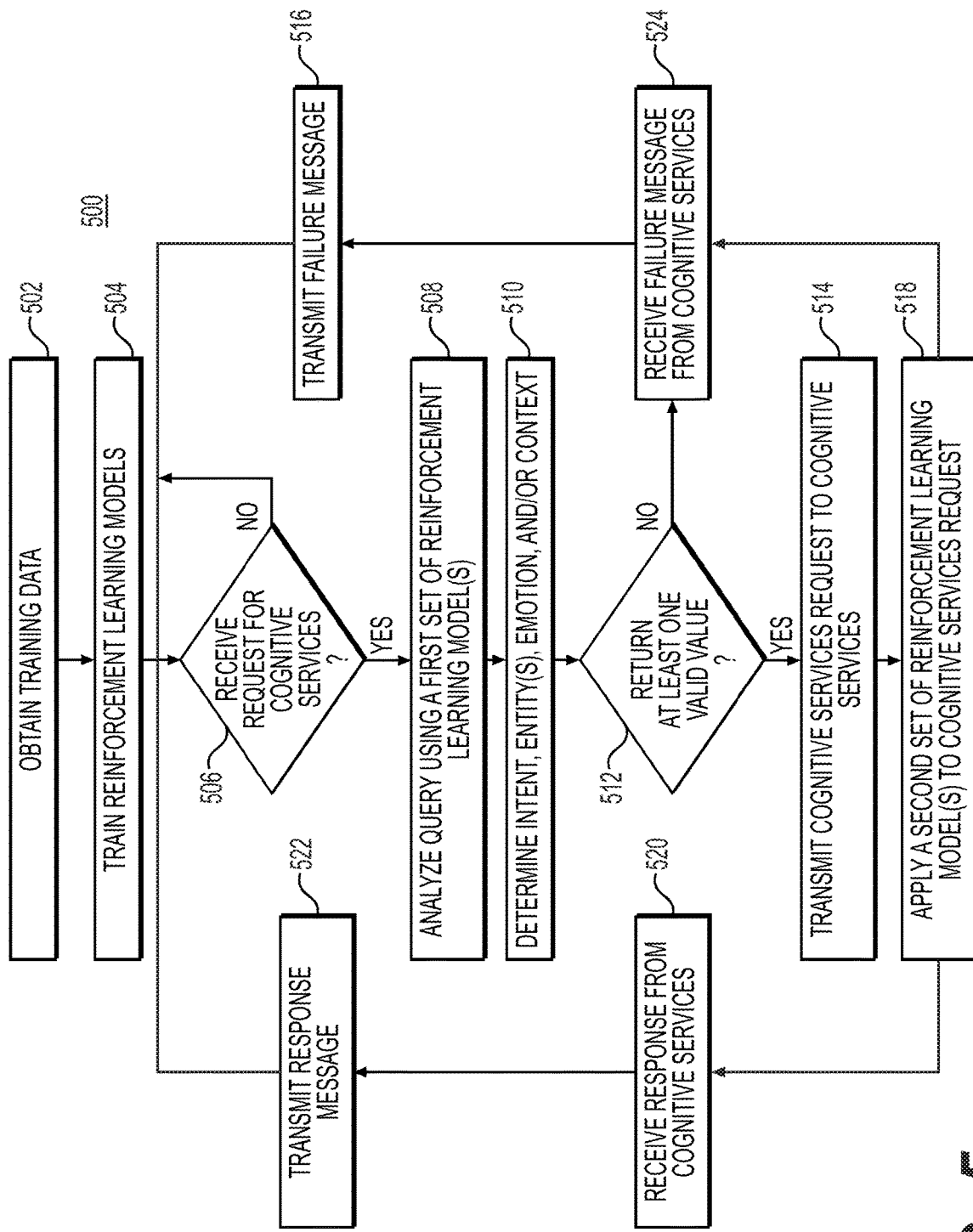
FIG. 5 depicts a flowchart of an exemplary method for cognitive services of a FMS SaaS platform, according to one or more embodiments.

FIG. 5 depicts a flowchart 500 of an exemplary method for providing cognitive services of a FMS SaaS platform, according to one or more embodiments. In the flowchart 500, the method may be performed by the systems 200, 300, or 400. Specifically, the cognitive services 250 may perform blocks 502, 504, and 518, while the cognitive interface 248 may perform blocks 506-516 and 518-522.

In the flowchart 400, the method may start at block 502 to obtain training data. Then, the method may proceed to block 504 to train reinforcement learning model(s) using the obtained training data.

Then, the method may proceed to block 506 to determine whether a request for cognitive services has been received. If it is determined that a request for cognitive services has not been received (Block 506: No), the method may proceed to block 506 to wait for a request for cognitive services.

If it is determined that a request for cognitive services has been received (Block 506: Yes), the method may proceed to block 508 to analyze a query of the received request for cognitive services using a first set of reinforcement learning model(s). Then, the method may proceed to block 510 to determine intent, entity(s), emotion, and/or context of the query based on an analysis result. Then, the method may proceed to block 512 to determine whether at least one valid value has been returned.

If it is determined that no valid values have been returned (Block 512: No), the method may proceed to block 516 to transmit failure message to a user who requested the cognitive services. Then, the method may proceed to block 506 to wait for a request for cognitive services.

If it is determined that at least one valid values has been returned (Block 512: Yes), the method may proceed to block 514 to transmit a cognitive services request to the cognitive services 250. Then, the method may proceed to block 518 to apply a second set of reinforcement learning model(s) to the cognitive services request.

Then, the method may proceed to block 520 to receive a response from cognitive services 250. Then, the method may proceed to block 522 to transmit response message to user who requested the cognitive services. Then, the method may proceed to block 506 to wait for a request for cognitive services.

Alternatively, the method may proceed to block 524 to receive a failure message from the cognitive services 250. Then, the method may proceed to block 516 to transmit a failure message to the user who requested the cognitive services. Then, the method may proceed to block 506 to wait for a request for cognitive services.

Figure 6:
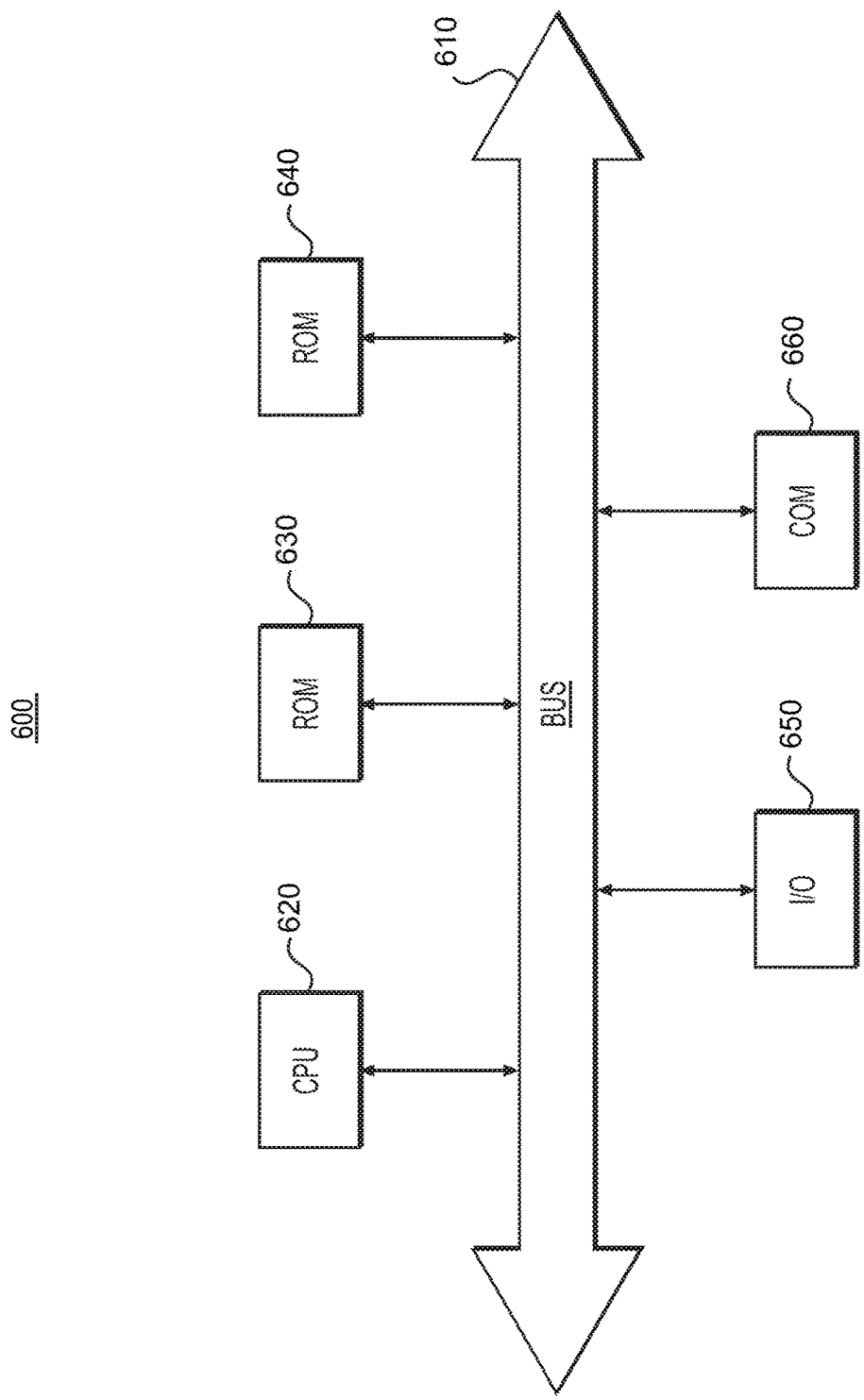
FIG. 6 depicts an example system that may execute techniques presented herein.

FIG. 6 depicts an example system that may execute techniques presented herein. FIG. 6 is a simplified functional block diagram of a computer that may be configured to execute techniques described herein, according to exemplary embodiments of the present disclosure. Specifically, the computer (or "platform" as it may not be a single physical computer infrastructure) may include a data communication interface 660 for packet data communication. The platform may also include a central processing unit ("CPU") 620, in the form of one or more processors, for executing program instructions. The platform may include an internal communication bus 610, and the platform may also include a program storage and/or a data storage for various data files to be processed and/or communicated by the platform such as ROM 630 and RAM 640, although the system 600 may receive programming and data via network communications. The system 600 also may include input and output ports 650 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of ±10% in a stated value.

The term "exemplary" is used in the sense of "example" rather than "ideal." As used herein, the singular forms "a," "an," and "the" include plural reference unless the context dictates otherwise.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for cognitive services for a flight management system (FMS) software as a service (SaaS) platform, comprising:
obtaining training data;
training one or more reinforcement learning models using the obtained training data to generate one or more trained reinforcement learning models;
in response to receiving a request for cognitive services from a user device, analyzing a query of the request for cognitive services using at least one trained reinforcement learning model of the one or more trained reinforcement learning models;
determining intent, entity, emotion, and/or context of the query based on an output of the at least one trained reinforcement learning model to form a cognitive services request;
applying a second at least one trained reinforcement learning model of the one or more trained reinforcement learning models to the cognitive services request to determine one or more services to invoke; and
transmitting a result to the user device based on an output of the one of more invoked services.

2. The method of claim 1, wherein the training the one or more reinforcement learning models using the obtained training data includes:
training the one or more reinforcement learning models using partially observable Markov decision processes that integrate Bayesian belief tracking and reward-based reinforcement learning methods.

3. The method of claim 2, wherein the one or more trained reinforcement learning models are distributed probabilistic models, so that the one or more trained reinforcement learning models evolve over time and adapt from experience, and
the one or more trained reinforcement learning models are tuned using hyperparameters to improve an accuracy of the one or more trained reinforcement learning models on the user's queries over time.

4. The method of claim 3, wherein the training data includes information from one or a combination of:
flight planning and navigation databases;
FMS performance databases; aircraft maintenance databases;
minimum equipment lists (MEL) datasets;
Flight operational quality assurance (FOQA) Datasets;
weather databases; and/or
traffic pattern datasets, and
the one or more trained reinforcement learning models are also tuned using certified FMS components, and validated using public datasets.

5. The method of claim 1, wherein the analyzing the query of the request for cognitive services using the at least one trained reinforcement learning model of the one or more trained reinforcement learning models includes:
applying transformations and/or pre-processing to the query to form feature vectors; and
applying the at least one trained reinforcement learning model of the one or more trained reinforcement learning models to the feature vectors to obtain targets, the targets indicating the intent, the entity, the emotion, and/or the context.

6. The method of claim 5, wherein the applying the second at least one trained reinforcement learning model of the one or more trained reinforcement learning models to the cognitive services request to determine one or more services to invoke includes:
applying the second at least one reinforcement learning model to the targets and/or contextual data provided by a context analyzer system to obtain a list of micro-services, third party APIs, and/or application requirements; and
using the list of micro-services, third party APIs, and/or applications requirements, transmitting invoke micro-service messages to the listed micro-services, transmitting requests for data and/or functionality to the listed third party APIs, and/or transmitting a request for an API mashup to an API mashup generator with the listed application requirements.

7. The method of claim 6, wherein the transmitting the result to the user device based on the output of the one of more invoked services includes:
after transmitting the invoke micro-service messages, the requests for data and/or functionality, and/or the request for the API mashup, receiving responses from the micro-services, the third party APIs, and/or the API mashup generator;
generating a response based on the received responses from the micro-services, the third party APIs, and/or the API mashup generator; and
transmitting the response as the result to the user device.

8. A system for cognitive services for a flight management system (FMS) software as a service (SaaS) platform, the system comprising:
a memory storing instructions; and
a processor executing the instructions to perform a process including:
obtaining training data;
training one or more reinforcement learning models using the obtained training data to generate one or more trained reinforcement learning models;
in response to receiving a request for cognitive services from a user device, analyzing a query of the request for cognitive services using at least one trained reinforcement learning model of the one or more trained reinforcement learning models;
determining intent, entity, emotion, and/or context of the query based on an output of the at least one trained reinforcement learning model to form a cognitive services request;
applying a second at least one trained reinforcement learning model of the one or more trained reinforcement learning models to the cognitive services request to determine one or more services to invoke; and
transmitting a result to the user device based on an output of the one of more invoked services.

9. The system of claim 8, wherein the training the one or more reinforcement learning models using the obtained training data includes:
training the one or more reinforcement learning models using partially observable Markov decision processes that integrate Bayesian belief tracking and reward-based reinforcement learning methods.

10. The system of claim 9, wherein the one or more trained reinforcement learning models are distributed probabilistic models, so that the one or more trained reinforcement learning models evolve over time and adapt from experience, and
the one or more trained reinforcement learning models are tuned using hyperparameters to improve an accuracy of the one or more trained reinforcement learning models on the user's queries over time.

11. The system of claim 10, wherein the training data includes information from one or a combination of:
flight planning and navigation databases;
FMS performance databases;
aircraft maintenance databases;
minimum equipment lists (MEL) datasets;
Flight operational quality assurance (FOQA) Datasets;
weather databases; and/or
traffic pattern datasets, and
the one or more trained reinforcement learning models are also tuned using certified FMS components, and validated using public datasets.

12. The system of claim 8, wherein the analyzing the query of the request for cognitive services using the at least one trained reinforcement learning model of the one or more trained reinforcement learning models) includes:
applying transformations and/or pre-processing to the query to form feature vectors; and
applying the at least one trained reinforcement learning model of the one or more trained reinforcement learning models to the feature vectors to obtain targets, the targets indicating the intent, the entity, the emotion, and/or the context.

13. The system of claim 12, wherein the applying the second at least one trained reinforcement learning model of the one or more trained reinforcement learning models to the cognitive services request to determine one or more services to invoke includes:
applying the second at least one reinforcement learning model to the targets and/or contextual data provided by a context analyzer system to obtain a list of micro-services, third party APIs, and/or application requirements; and
using the list of micro-services, third party APIs, and/or applications requirements, transmitting invoke micro-service messages to the listed micro-services, transmitting requests for data and/or functionality to the listed third party APIs, and/or transmitting a request for an API mashup to an API mashup generator with the listed application requirements.

14. The system of claim 13, wherein the transmitting the result to the user device based on the output of the one of more invoked services includes:
after transmitting the invoke micro-service messages, the requests for data and/or functionality, and/or the request for the API mashup, receiving responses from the micro-services, the third party APIs, and/or the API mashup generator;
generating a response based on the received responses from the micro-services, the third party APIs, and/or the API mashup generator; and
transmitting the response as the result to the user device.

15. A non-transitory computer-readable medium storing instructions that, when executed by a processor, cause the processor to perform a method for cognitive services for a flight management system (FMS) software as a service (SaaS) platform, the method comprising:
obtaining training data;
training one or more reinforcement learning models using the obtained training data to generate one or more trained reinforcement learning models;
in response to receiving a request for cognitive services from a user device, analyzing a query of the request for cognitive services using at least one trained reinforcement learning model of the one or more trained reinforcement learning models;
determining intent, entity, emotion, and/or context of the query based on an output of the at least one trained reinforcement learning model to form a cognitive services request;
applying a second at least one trained reinforcement learning model of the one or more trained reinforcement learning models to the cognitive services request to determine one or more services to invoke; and
transmitting a result to the user device based on an output of the one of more invoked services.

16. The non-transitory computer-readable medium of claim 15, wherein the training the one or more reinforcement learning models using the obtained training data includes:
training the one or more reinforcement learning models using partially observable Markov decision processes that integrate Bayesian belief tracking and reward-based reinforcement learning methods.

17. The non-transitory computer-readable medium of claim 16, wherein the one or more trained reinforcement learning models are distributed probabilistic models, so that the one or more trained reinforcement learning models evolve over time and adapt from experience, and
the one or more trained reinforcement learning models are tuned using hyperparameters to improve an accuracy of the one or more trained reinforcement learning models on the user's queries over time.

18. The non-transitory computer-readable medium of claim 17, wherein the training data includes information from one or a combination of:
flight planning and navigation databases;
FMS performance databases;
aircraft maintenance databases;
minimum equipment lists (MEL) datasets;
Flight operational quality assurance (FOQA) Datasets;
weather databases; and/or
traffic pattern datasets, and
the one or more trained reinforcement learning models are also tuned using certified FMS components, and validated using public datasets.

19. The non-transitory computer-readable medium of claim 15, wherein the analyzing the query of the request for cognitive services using the at least one trained reinforcement learning model of the one or more trained reinforcement learning models includes:
applying transformations and/or pre-processing to the query to form feature vectors; and
applying the at least one trained reinforcement learning model of the one or more trained reinforcement learning models to the feature vectors to obtain targets, the targets indicating the intent, the entity, the emotion, and/or the context.

20. The non-transitory computer-readable medium of claim 15, wherein the applying the second at least one trained reinforcement learning model of the one or more trained reinforcement learning models to the cognitive services request to determine one or more services to invoke includes:
applying the second at least one reinforcement learning model to the targets and/or contextual data provided by a context analyzer system to obtain a list of micro-services, third party APIs, and/or application requirements; and
using the list of micro-services, third party APIs, and/or applications requirements, transmitting invoke micro-service messages to the listed micro-services, transmitting requests for data and/or functionality to the listed third party APIs, and/or transmitting a request for an API mashup to an API mashup generator with the listed application requirements.

* * * * *